United States Patent
Leyerle et al.

(10) Patent No.: US 9,449,494 B2
(45) Date of Patent: Sep. 20, 2016

(54) FIRST-RESPONDER NOTIFICATION FOR ALTERNATIVE FUEL VEHICLES

(75) Inventors: James W. Leyerle, Pleasant Ridge, MI (US); Kevin R. Krause, Plymouth, MI (US)

(73) Assignee: General Motors LLC, Detroit, MI (US)

( * ) Notice: Subject to any disclaimer, the term of this patent is extended or adjusted under 35 U.S.C. 154(b) by 1915 days.

(21) Appl. No.: 12/416,659

(22) Filed: Apr. 1, 2009

(65) Prior Publication Data

US 2010/0256859 A1    Oct. 7, 2010

(51) Int. Cl.
| G06F 7/00 | (2006.01) |
| G08B 25/01 | (2006.01) |
| G08G 1/0965 | (2006.01) |
| B60R 21/00 | (2006.01) |

(52) U.S. Cl.
 CPC ............ *G08B 25/016* (2013.01); *G08G 1/0965* (2013.01); *B60R 2021/0027* (2013.01)

(58) Field of Classification Search
 CPC ...................................................... G08G 1/017
 USPC ............ 707/301; 340/426.3; 440/6; 455/404
 See application file for complete search history.

(56) References Cited

U.S. PATENT DOCUMENTS

| 6,266,617 | B1 * | 7/2001 | Evans | 701/301 |
| 6,442,485 | B2 * | 8/2002 | Evans | 701/301 |
| 6,748,211 | B1 * | 6/2004 | Isaac et al. | 455/414.1 |
| 6,756,887 | B2 * | 6/2004 | Evans | 340/436 |
| 7,069,118 | B2 * | 6/2006 | Coletrane et al. | 701/1 |
| 7,289,786 | B2 * | 10/2007 | Krasner | G08B 25/016 340/436 |
| 7,353,897 | B2 * | 4/2008 | Fernandez | B60L 1/00 180/65.8 |
| 7,789,723 | B2 * | 9/2010 | Dane et al. | 440/6 |
| 8,725,551 | B2 * | 5/2014 | Ambrosio | G06Q 30/02 705/7.31 |
| 2001/0051853 | A1 * | 12/2001 | Evans | 701/301 |
| 2003/0016147 | A1 * | 1/2003 | Evans | 340/988 |
| 2004/0104814 | A1 * | 6/2004 | Christensen | B60L 11/1827 340/426.16 |
| 2005/0021224 | A1 * | 1/2005 | Gray | 701/200 |
| 2007/0021915 | A1 * | 1/2007 | Breed et al. | 701/301 |
| 2007/0087756 | A1 * | 4/2007 | Hoffberg | 455/450 |
| 2007/0247289 | A1 * | 10/2007 | Buckley | G08B 25/016 340/426.3 |
| 2008/0162036 | A1 * | 7/2008 | Breed | G08G 1/161 701/408 |
| 2008/0300729 | A1 * | 12/2008 | Bono | B60L 3/0046 700/287 |

* cited by examiner

*Primary Examiner* — Teresa Williams
(74) *Attorney, Agent, or Firm* — Christopher DeVries; Reising Ethington P.C.

(57) ABSTRACT

A method for notifying parties in close proximity to a vehicle of a potential vehicle hazard includes detecting that the vehicle has been in a collision, determining the type of propulsion system used by the vehicle, generating a warning or other notification relating to the propulsion system, and communicating the notification to a party located within a predetermined range of the vehicle. Communication of the notification can be carried out by renaming the telematics unit with a device name corresponding to a hazard associated with the propulsion system, and then broadcasting the device name according to an established wireless protocol.

20 Claims, 2 Drawing Sheets

FIRST-RESPONDER NOTIFICATION FOR ALTERNATIVE FUEL VEHICLES

TECHNICAL FIELD

The present invention relates generally to vehicle communications and more particularly to providing warnings and other notifications to first responders and other vehicle assistance personnel at the site of an alternative fuel vehicle.

BACKGROUND OF THE INVENTION

Vehicle manufacturers produce vehicles used for transportation in many different configurations using various different types of propulsion systems (e.g., engines or other powerplants). Most consume gasoline or diesel. More recently, manufacturers have increased production of vehicles having propulsion systems that utilize alternative fuels. These vehicles are sometimes referred to as alternative fuel vehicles. While a familiarity exists for the characteristics and precautions taken when dealing with gasoline/diesel and common internal combustion engines, that familiarity may not extend to alternative fuel vehicles. And the unique propulsion system characteristics of a particular vehicle, such as an alternative fuel vehicle may not be immediately apparent from the vehicle's external appearance.

SUMMARY OF THE INVENTION

According to an aspect of the invention, a method is provided for notifying parties in close proximity to a vehicle of a potential vehicle hazard. The method includes the steps of identifying an abnormal condition of a vehicle, generating a notification that identifies at least one possible hazard relating to a propulsion system used by the vehicle, and communicating the notification to a party located within a predetermined range of the vehicle.

According to another aspect of the invention, a method is provided for notifying parties of a potential vehicle hazard using the steps of: including a propulsion system identifier with a vehicle identification number (VIN), detecting that the vehicle is disabled, accessing the propulsion system identifier to determine the type of propulsion system installed on the vehicle, determining at least one hazard posed in the immediate area of the vehicle relating to the propulsion system, and wirelessly communicating a notification concerning the hazard using a vehicle telematics unit to at least one device able to receive short-range wireless communications.

According to yet another aspect of the invention, a method is provided for supplying information concerning a propulsion system on a vehicle equipped with a telematics unit configured for short-range wireless communication via an established protocol that enables broadcasting of a device name for the telematics unit. The method comprises the steps of detecting that a vehicle has been involved in a collision, renaming the telematics unit with a device name relating to the type of propulsion system used by the vehicle, activating the short-range wireless communication using the established protocol, and broadcasting the device name via the short-range communication.

BRIEF DESCRIPTION OF THE DRAWINGS

One or more preferred exemplary embodiments of the invention will hereinafter be described in conjunction with the appended drawings, wherein like designations denote like elements, and wherein.

DETAILED DESCRIPTION OF THE PREFERRED EMBODIMENT(S)

The method and system described below can be used to alert first responders and/or other nearby parties of the hazards a particular vehicle poses. When a vehicle experiences an abnormal condition, such as a collision, failure of the propulsion system, or other malfunction, elements of the propulsion system may benefit from unique attention from first responders or individuals attempting to assist a vehicle owner. Unlike the commonly known and ubiquitous gasoline engine, alternative fuel vehicles exist in many variants. These alternative fuel vehicles include hybrid, electric, E85, E100, hydrogen, fuel cell, and extended range electric vehicles. And each variant can have unique features or concerns unfamiliar to first responders. As used herein, first responders can include police officers, firemen, emergency medical personnel, or any other person or entity giving assistance to a vehicle or its occupants. The first responders can encounter a variety of vehicles, each with different configurations. The described method and system can inform the first responders or other nearby parties of unique concerns, instructions, or cautions associated with a particular vehicle.

When a vehicle collision or malfunction occurs, the vehicle can use at least one of several systems and methods to convey a notification associated with the particular vehicle. In one embodiment, after detecting an abnormal vehicle condition, a vehicle telematics unit can broadcast the notification via a short-range wireless transmission. The short-range wireless transmission can use Bluetooth or other protocol to communicate with other nearby wireless devices. The vehicle telematics unit can change its device name to identify any unique concerns, instructions, or cautions associated with a particular vehicle. This method is effective even if cellular service is degraded or non-existent. Additionally, other Wi-Fi like protocols can be used to broadcast the notification associated with the disabled vehicle. During the broadcast of this notification, nearby individuals or first responders using a wireless device with Wi-Fi/Bluetooth capability can scan the area and receive the notification. The telematics unit can also broadcast a general instruction that can quickly alert nearby parties of the status of an alternative fuel vehicle.

Figure 1:
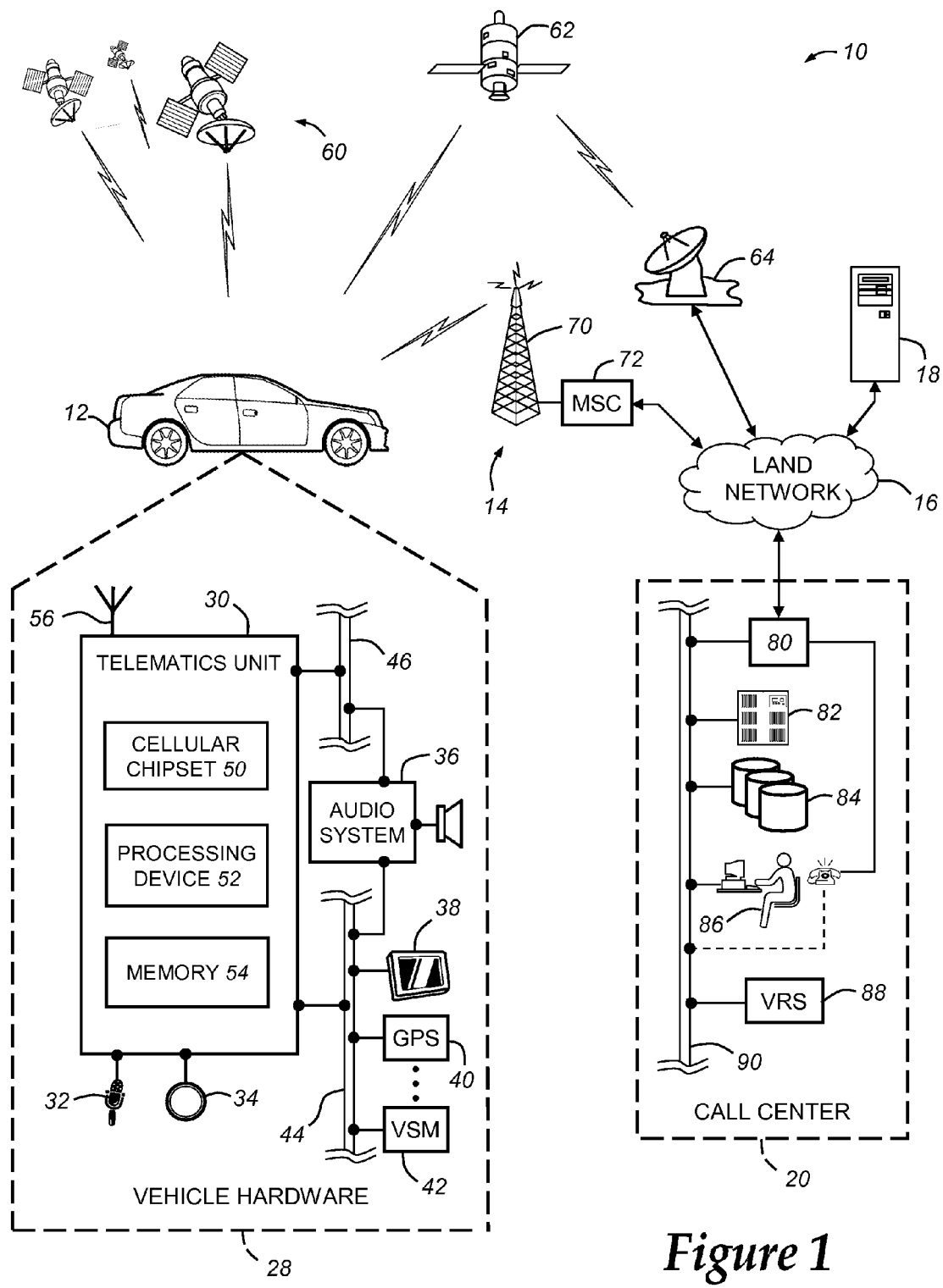
FIG. 1 is a block diagram depicting an exemplary embodiment of a communications system that is capable of utilizing the method disclosed herein.

With reference to FIG. 1, there is shown an exemplary operating environment that comprises a mobile vehicle communications system 10 and that can be used to implement the method disclosed herein. Communications system 10 generally includes a vehicle 12, one or more wireless carrier systems 14, a land communications network 16, a computer 18, and a call center 20. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such exemplary system 10; however, other systems not shown here could employ the disclosed method as well.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 28 is shown generally in FIG. 1 and includes a telematics unit 30, a microphone 32, one or more pushbuttons or other control inputs 34, an audio system 36, a visual display 38, and a GPS module 40 as well as a number of vehicle system modules (VSMs) 42. Some of these devices can be connected directly to the telematics unit such as, for example, the microphone 32 and pushbutton(s) 34, whereas others are indirectly connected using one or more network connections, such as a communications bus 44 or an entertainment bus 46. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

Telematics unit 30 is an OEM-installed device that enables wireless voice and/or data communication over wireless carrier system 14 and via wireless networking so that the vehicle can communicate with call center 20, other telematics-enabled vehicles, or some other entity or device. The telematics unit preferably uses radio transmissions to establish a communications channel (a voice channel and/or a data channel) with wireless carrier system 14 so that voice and/or data transmissions can be sent and received over the channel. By providing both voice and data communication, telematics unit 30 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the call center 20) and data communication (e.g., to provide GPS location data or vehicle diagnostic data to the call center 20), the system can utilize a single call over a voice channel and switch as needed between voice and data transmission over the voice channel, and this can be done using techniques known to those skilled in the art.

According to one embodiment, telematics unit 30 utilizes cellular communication according to either GSM or CDMA standards and thus includes a standard cellular chipset 50 for voice communications like hands-free calling, a wireless modem for data transmission, an electronic processing device 52, one or more digital memory devices 54, and a dual antenna 56. It should be appreciated that the modem can either be implemented through software that is stored in the telematics unit and is executed by processor 52, or it can be a separate hardware component located internal or external to telematics unit 30. The modem can operate using any number of different standards or protocols such as EVDO, CDMA, GPRS, and EDGE. Wireless networking between the vehicle and other networked devices can also be carried out using telematics unit 30. For this purpose, telematics unit 30 can be configured to communicate wirelessly according to one or more wireless protocols, such as any of the IEEE 802.11 protocols, WiMAX, or Bluetooth. When used for packet-switched data communication such as TCP/IP, the telematics unit can be configured with a static IP address or can set up to automatically receive an assigned IP address from another device on the network such as a router or from a network address server.

Processor 52 can be any type of device capable of processing electronic instructions including microprocessors, microcontrollers, host processors, controllers, vehicle communication processors, and application specific integrated circuits (ASICs). It can be a dedicated processor used only for telematics unit 30 or can be shared with other vehicle systems. Processor 52 executes various types of digitally-stored instructions, such as software or firmware programs stored in memory 54, which enable the telematics unit to provide a wide variety of services. For instance, processor 52 can execute programs or process data to carry out at least a part of the method discussed herein.

Telematics unit 30 can be used to provide a diverse range of vehicle services that involve wireless communication to and/or from the vehicle. Such services include: turn-by-turn directions and other navigation-related services that are provided in conjunction with the GPS-based vehicle navigation module 40; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 30, but are simply an enumeration of some of the services that the telematics unit is capable of offering. Furthermore, it should be understood that at least some of the aforementioned modules could be implemented in the form of software instructions saved internal or external to telematics unit 30, they could be hardware components located internal or external to telematics unit 30, or they could be integrated and/or shared with each other or with other systems located throughout the vehicle, to cite but a few possibilities. In the event that the modules are implemented as VSMs 42 located external to telematics unit 30, they could utilize vehicle bus 44 to exchange data and commands with the telematics unit.

GPS module 40 receives radio signals from a constellation 60 of GPS satellites. From these signals, the module 40 can determine vehicle position that is used for providing navigation and other position-related services to the vehicle driver. Navigation information can be presented on the display 38 (or other display within the vehicle) or can be presented verbally such as is done when supplying turn-by-turn navigation. The navigation services can be provided using a dedicated in-vehicle navigation module (which can be part of GPS module 40), or some or all navigation services can be done via telematics unit 30, wherein the position information is sent to a remote location for purposes of providing the vehicle with navigation maps, map annotations (points of interest, restaurants, etc.), route calculations, and the like. The position information can be supplied to call center 20 or other remote computer system, such as computer 18, for other purposes, such as fleet management. Also, new or updated map data can be downloaded to the GPS module 40 from the call center 20 via the telematics unit 30.

Apart from the audio system 36 and GPS module 40, the vehicle 12 can include other vehicle system modules (VSMS) 42 in the form of electronic hardware components that are located throughout the vehicle and typically receive input from one or more sensors and use the sensed input to perform diagnostic, monitoring, control, reporting and/or other functions. Each of the VSMs 42 is preferably connected by communications bus 44 to the other VSMs, as well as to the telematics unit 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 28 also includes a number of vehicle user interfaces that provide vehicle occupants with a means of providing and/or receiving information, including microphone 32, pushbuttons(s) 34, audio system 36, and visual display 38. As used herein, the term 'vehicle user interface' broadly includes any suitable form of electronic device, including both hardware and software components, which is located on the vehicle and enables a vehicle user to communicate with or through a component of the vehicle. Microphone 32 provides audio input to the telematics unit to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 34 allow manual user input into the telematics unit 30 to initiate wireless telephone calls and provide other data, response, or control input. Separate pushbuttons can be used for initiating emergency calls versus regular service assistance calls to the call center 20. Audio system 36 provides audio output to a vehicle occupant and can be a dedicated, stand-alone system or part of the primary vehicle audio system. According to the particular embodiment shown here, audio system 36 is operatively coupled to both vehicle bus 44 and entertainment bus 46 and can provide AM, FM and satellite radio, CD, DVD and other multimedia functionality. This functionality can be provided in conjunction with or independent of the infotainment module described above. Visual display 38 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites 62 and an uplink transmitting station 64. Uni-directional communication can be, for example, satellite radio services, wherein programming content (news, music, etc.) is received by transmitting station 64, packaged for upload, and then sent to the satellite 62, which broadcasts the programming to subscribers. Bi-directional communication can be, for example, satellite telephony services using satellite 62 to relay telephone communications between the vehicle 12 and station 64. If used, this satellite telephony can be utilized either in addition to or in lieu of wireless carrier system 14.

Land network 16 may be a conventional land-based telecommunications network that is connected to one or more landline telephones and connects wireless carrier system 14 to call center 20. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof. Furthermore, call center 20 need not be connected via land network 16, but could include wireless telephony equipment so that it can communicate directly with a wireless network, such as wireless carrier system 14.

Computer 18 can be one of a number of computers accessible via a private or public network such as the Internet. Each such computer 18 can be used for one or more purposes, such as a web server accessible by the vehicle via telematics unit 30 and wireless carrier 14. Other such accessible computers 18 can be, for example: a service center computer where diagnostic information and other vehicle data can be uploaded from the vehicle via the telematics unit 30; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12 or call center 20, or both. A computer 18 can also be used for providing Internet connectivity such as DNS services or as a network address server that uses DHCP or other suitable protocol to assign an IP address to the vehicle 12.

Call center 20 is designed to provide the vehicle electronics 28 with a number of different system back-end functions and, according to the exemplary embodiment shown here, generally includes one or more switches 80, servers 82, databases 84, live advisors 86, as well as an automated voice response system (VRS) 88, all of which are known in the art. These various call center components are preferably coupled to one another via a wired or wireless local area network 90. Switch 80, which can be a private branch exchange (PBX) switch, routes incoming signals so that voice transmissions are usually sent to either the live adviser 86 by regular phone or to the automated voice response system 88 using VoIP. The live advisor phone can also use VoIP as indicated by the broken line in FIG. 1. VoIP and other data communication through the switch 80 is implemented via a modem (not shown) connected between the switch 80 and network 90. Data transmissions are passed via the modem to server 82 and/or database 84. Database 84 can store account information such as subscriber authentication information, vehicle identifiers, profile records, behavioral patterns, and other pertinent subscriber information. Data transmissions may also be conducted by wireless systems, such as 802.11x, GPRS, and the like. Although the illustrated embodiment has been described as it would be used in conjunction with a manned call center 20 using live advisor 86, it will be appreciated that the call center can instead utilize VRS 88 as an automated advisor or, a combination of VRS 88 and the live advisor 86 can be used.

Figure 2:
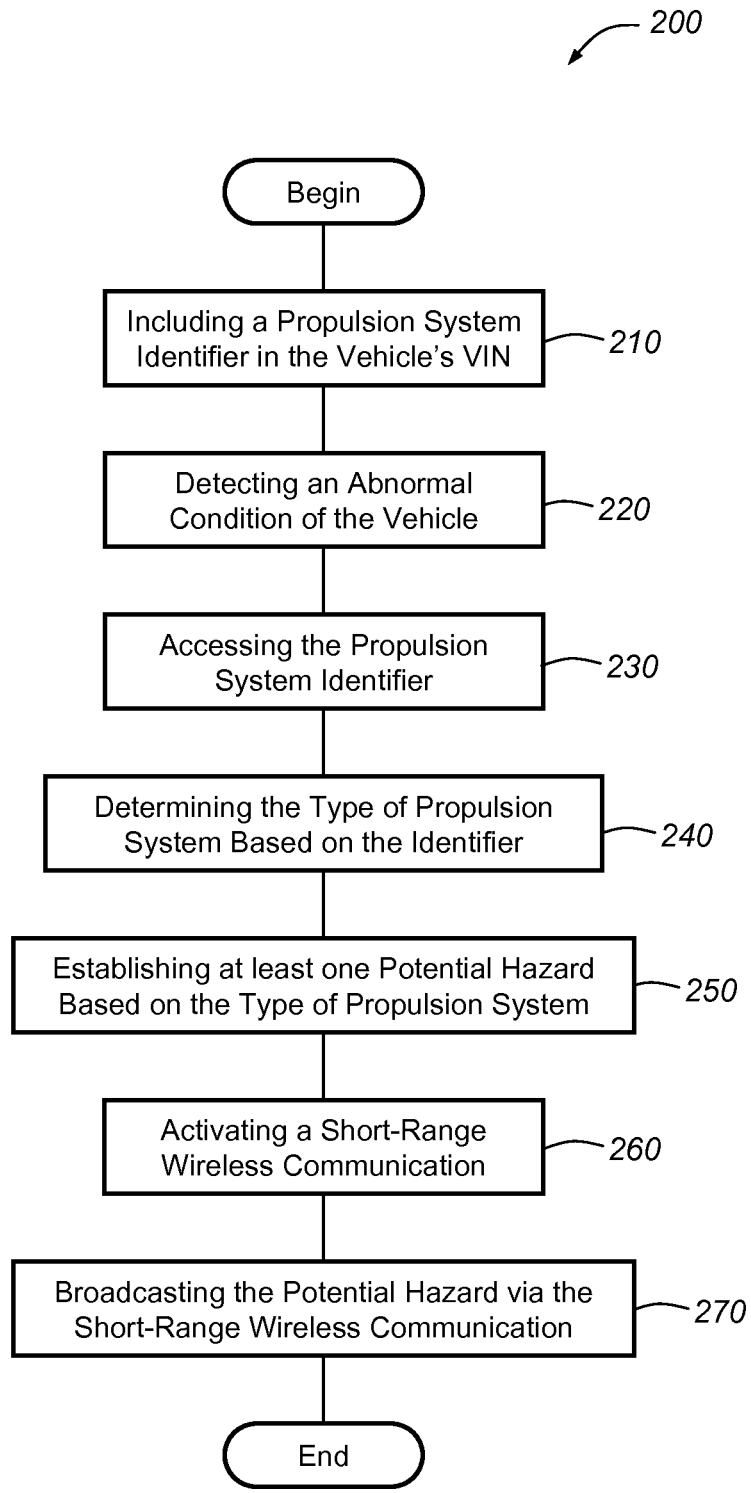
FIG. 2 is a block diagram depicting a method of notifying parties in close proximity to a vehicle of potentially hazardous vehicle characteristics.

Turning now to FIG. 2, there is provided a method for notifying parties in close proximity to a vehicle of a potential hazard associated with the particular vehicle. The method 200 begins at step 210 when a propulsion system identifier is included with a vehicle identification number (VIN). The VIN is a seventeen character code consisting of numbers and letters generally with the exception of I, O, and Q to prevent confusion. The code is alphanumeric and includes a hierarchy for identifying various features of an vehicle. For instance, the $4^{th}$-$8^{th}$ characters are particularly set aside for the identification of vehicle features. A propulsion system identifier can be included in the $4^{th}$-$8^{th}$ characters of the VIN and can comprise a single character or multiple characters. The propulsion system identifier can be a numerical, alphabetical, or alphanumerical code that indicates the type of propulsion system installed in a vehicle 12. Once the propulsion system identifier is included with a VIN or assigned to a particular vehicle 12, the identifier can be saved in the telematics unit 30 of the vehicle 12 and/or the identifier can be saved at the call center 20, such as in database 84, and accessed using the telematics unit 30. This step 210 is typically done during manufacturing of the vehicle. The method 200 then proceeds to step 220.

At step 220, an abnormal condition of a vehicle is detected. An abnormal condition of a vehicle can be that the vehicle or at least its propulsion system is disabled from full operation. Also, an abnormal vehicle condition can be a collision event. For instance, if the vehicle 12 is involved in an accident, the vehicle 12 can sit immobile. The immobility of a vehicle 12 is an abnormal condition and it may be helpful for first responders to know particular procedures for servicing or moving the immobilized vehicle 12. The abnormal condition can be detected using a vehicle system module (VSM) 42 that monitors various vehicle conditions. The VSM 42 can detect when a certain measurement is outside of a normal range of measurements and alert the telematics unit 30. Or the abnormal condition can be detected based on input used by other vehicle systems, such as from a crash sensor used for air bag deployment or from a hydrogen fuel leak sensor. The abnormal condition may depend on the propulsion system installed on the vehicle 12.

In one example, the vehicle 12 can be powered using a hybrid-electric propulsion system. A hybrid-electric propulsion system can include a high-voltage battery and a master switch. When servicing the vehicle 12 or if the vehicle 12 becomes immobile, a vehicle manufacturer may suggest that the master switch be open or moved to the off position before moving or servicing the disabled vehicle 12. The method 200 then proceeds to step 230.

At step 230, the propulsion system identifier is accessed using a vehicle telematics unit. The propulsion system identifier can be stored in memory 54 of the telematics unit 30. When the abnormal condition of the vehicle 12 is detected, the processing device 52 can access memory 54 and obtain the propulsion system identifier. In one example, the propulsion system identifier can be stored as a unique code at the vehicle 12, such as in memory 54 of the telematics unit 30. In another example, the propulsion system identifier can be stored as part of the VIN as described above. The method 200 then proceeds to step 240.

At step 240, the type of propulsion system installed on the vehicle is determined based on the propulsion system identifier. Propulsion systems for alternative fuel vehicles include but are not limited to a fuel cell, a hybrid-electric propulsion system, a high-voltage battery, or combination of any one of these propulsion systems with an internal combustion engine. After obtaining the propulsion system identifier, the processing device 52 can compare the propulsion system identifier to an onboard database containing propulsion system identifiers linked to a particular propulsion system. The vehicle manufacturer can store the onboard database at a variety of places on the vehicle 12, such as the memory 54 in the telematics unit 30. Additionally, the propulsion system identifier can be stored at a call center 20 and accessed using the vehicle telematics unit 30. For instance, if an abnormal vehicle condition is detected, the telematics unit 30 can request via the wireless system 14 the propulsion system identifier from the call center 20. The telematics unit 30 can then receive the propulsion system identifier and compare it to the onboard database of propulsion system identifiers. In another example, the call center 20 can explicitly inform the vehicle telematics unit 30 the type of propulsion system installed on the vehicle. The method 200 then proceeds to step 250.

At step 250, one or more unique characteristics or hazards posed in the immediate area of the vehicle are established and derived from the type of propulsion system. This can be done based on the propulsion system identifier. In other embodiments, no such identifier is used; rather, the vehicle can pre-store one or more suitable notifications that can be provided in the event of a collision or other abnormal situation, without having to separately determine what type of propulsion system is used by the vehicle.

As noted above, various vehicle propulsion systems can have unique concerns, instructions, or cautions associated with a particular vehicle not readily apparent from the exterior of a vehicle 12. So for each type of propulsion system, a list of instructions or cautions can be specifically tailored. As noted above, a hybrid-electric propulsion system can use a master switch and if the vehicle 12 is immobilized the vehicle manufacturer can recommend opening the switch or moving the switch to the off position before attending to the vehicle 12. This action is one example of a unique characteristic affecting the immediate area of the vehicle 12 and derived from the type of propulsion system. In this example, opening the master switch can be added to a list or file of instructions or concerns relating to a hybrid-electric propulsion system. While the list may only include one instruction, such as the instruction relating to the master switch, the list can also include additional instructions, such as a particular method for jump-starting the vehicle 12 or information about a high-voltage battery. Similar lists or files can be created for fuel-cell propulsion systems or propulsion systems that consume ethanol, compressed natural gas (CNG), hydrogen, or gasoline. Generally, the list or file comprises a notification that is supplied to first responders who will have direct contact with the vehicle 12 and/or to individuals nearby the vehicle 12 who may be affected by the abnormal condition of the vehicle 12. The method 200 then proceeds to step 260.

At step 260, a short-range wireless communication connection is activated between the vehicle telematics unit and a device capable of receiving short-range communications. The short-range wireless communication can utilize an established protocol that enables broadcasting of a name associated with the telematics unit. This permits use of the name as a notification to nearby portable devices such as may be carried by first responders or others nearby. To carry this out, the telematics unit can be configured with the name which it then broadcasts wirelessly. For example, the name can be the wireless device name associated with the telematics unit or can be a network name broadcasted by the telematics unit. In one embodiment, the Bluetooth protocol is used to send the device name, the device class, the list of services the device provides, and any specific technical information such as device features, device manufacturer, Bluetooth specification used, or clock offset. While the device names of many Bluetooth devices are fixed at the factory as the manufacturer name and model of phone, the vehicle telematics unit 30 can be configured so that it can modify its device name to include the notification, or a list or other identification of unique characteristics, instructions, or cautions described in step 250. In one example, the vehicle telematics unit 30 acts as a Bluetooth device and broadcasts a warning notification as its device name. In this example, the device name includes a textual representation of the desired notification. And, while step 260 has been described in terms of the Bluetooth protocol, it is possible to transmit the unique characteristics, instructions, or cautions using an adhoc wireless network or a different short-range wireless protocol, such as 802.11 or other WiFi techniques known to those skilled in the art. Where an 802.11 wireless network protocol is used, for example, the telematics unit can be configured so that it broadcasts the notification of the potential hazard as the wireless network name so that it appears on nearby wireless devices that support that protocol. Apart from the hazard notification, other data can be broadcast as well, such as the propulsion system identifier. Where multiple vehicles containing alternative fuels and/or propulsion systems are involved in a collision, each vehicle can separately broadcast its notification and/or propulsion system identifier. The method 200 then proceeds to step 270.

At step 270, the notification is broadcast via the short-range communications. Any wireless device that includes transceiving capability in range of the short-range wireless signal can receive and display the notification on the screen of the wireless device. Where the telematics unit has been configured to rename itself or its network with the notification, the receiving wireless devices nearby will display the notification as the name of the telematics unit or network, which can be used to alert the recipient of the notification and associated potential hazard. Alternatively, the notification can comprise data that is exchanged wirelessly between the telematics unit 30 and local wireless devices using other short-range wireless protocols known to those in the art.

In addition to the short-range wireless broadcast, other systems can augment the wireless broadcast. For instance, the notification can be a prerecorded message intended for audible broadcast. The audible recording can be broadcast via the short-range wireless communications to local wireless devices where the prerecorded message can be played aloud on a speaker. Additionally, the notification can be audibly read by the receiving wireless device using text-to-speech software. The vehicle 12 can also audibly broadcast the prerecorded message through the audio system 36 or using another speaker (not shown) mounted on the vehicle 12. In another example, the vehicle 12 can display the unique characteristics, instructions, or cautions on the visual display 38. It is also possible to alert first responders and local individuals to the broadcasts discussed above using flashing lights. The exterior lights of the vehicle 12 can be periodically flashed at various rates. Used in conjunction with the prerecorded message played audibly, the flashing lights can help alert first responders and others to the broadcast short-range communications. Furthermore, the vehicle 12 can also be equipped with a dedicated strobe light that produces a strobe effect that can help alert first responders and nearby individuals to the short-range communications. The method 200 then ends.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of notifying parties in close proximity to a vehicle of a potential vehicle hazard, comprising the steps of:
   (a) identifying an abnormal condition of a vehicle using one or more vehicle system modules (VSMs);
   (b) determining a type of propulsion system installed on the vehicle;
   (c) generating a notification that identifies at least one possible hazard relating to the determined type of propulsion system;
   (d) communicating the notification to a party located within a predetermined range of the vehicle using a vehicle telematics unit; and
   (e) presenting the notification to the party at a wireless device within the predetermined range of the vehicle.

2. The method of claim 1, wherein step (d) further comprises presenting the notification on an electronic display located on the vehicle.

3. The method of claim 1, wherein step (d) further comprises the steps of:
 accessing an audible recording of the notification; and
 broadcasting the recording via a speaker located on the vehicle.

4. The method of claim 1, wherein step (b) further comprises accessing a vehicle identification number (VIN) stored on the vehicle, wherein the VIN includes a propulsion system identifier, and determining the type of propulsion system based on the propulsion system identifier, and wherein step (c) further comprises generating the notification based on the propulsion system identifier.

5. The method of claim 1, wherein the propulsion system of the vehicle comprises a fuel-cell propulsion system, a hybrid-electric propulsion system, or a high-voltage battery propulsion system.

6. The method of claim 1, wherein step (c) further comprises configuring an on-board vehicle telematics unit with a name that identifies the hazard, and wherein step (d) further comprises supplying the name wirelessly to nearby portable communication devices.

7. The method of claim 6, wherein the name comprises a wireless device name for the telematics unit or a wireless network name broadcasted by the telematics unit.

8. The method of claim 1, wherein step (a) further comprises the step of detecting a propulsion system failure or a collision event.

9. A method of notifying parties in close proximity to a vehicle of a potential vehicle hazard, comprising the steps of:
 (a) including a propulsion system identifier with a vehicle identification number (VIN);
 (b) detecting that the vehicle is disabled;
 (c) accessing the propulsion system identifier to determine the type of propulsion system installed on the vehicle;
 (d) determining at least one hazard posed in the immediate area of the vehicle relating to the propulsion system; and
 (e) wirelessly communicating a notification concerning the hazard using a vehicle telematics unit to at least one device able to receive short-range wireless communications.

10. The method of claim 9, further comprising the step of activating an exterior vehicle light that produces periodic flashes of light.

11. The method of claim 9, further comprising the step of presenting the one or more hazard on an electronic display located on the vehicle.

12. The method of claim 9, further comprising the steps of:
 accessing an audible recording of the notification; and
 broadcasting the recording via a speaker located on the vehicle.

13. The method of claim 9, wherein the propulsion system of the vehicle comprises a fuel-cell propulsion system, a hybrid-electric propulsion system, or a high-voltage battery propulsion system.

14. The method of claim 9, wherein step (e) further comprises the steps of:
 configuring the telematics unit with a name that corresponds to at least one identified hazard; and
 supplying the name to the device via the short-range communications.

15. A method of notifying parties in close proximity to a vehicle of a potential vehicle hazard, comprising the steps of:
 (a) detecting that a vehicle has been involved in a collision using one or more vehicle sensors, the vehicle being equipped with a telematics unit configured for short-range wireless communication via an established protocol that enables broadcasting of a name, wherein the name comprises a device name for the telematics unit or a wireless network name broadcasted by the telematics unit;
 (b) configuring the telematics unit so that the name includes a warning notification relating to the type of propulsion system used by the vehicle;
 (c) activating the short-range wireless communication from the vehicle using the established protocol; and
 (d) broadcasting the name from the vehicle via the short-range communication.

16. The method of claim 15, wherein step (b) further comprises the steps of:
 accessing a vehicle identification number (VIN) stored on the vehicle;
 retrieving a propulsion system identifier from the VIN; and
 configuring the telematics unit so that the warning notification used in the name corresponds to the propulsion system identifier.

17. The method of claim 15, further comprising the steps of:
 accessing an audible recording relating to the type of propulsions system; and
 broadcasting the recording via a speaker located on the vehicle.

18. The method of claim 15, wherein step (b) further comprises changing the device name or the wireless network name to a textual representation of the warning notification.

19. The method of claim 15, wherein the propulsion system of the vehicle comprises a fuel cell propulsion system, a hybrid-electric propulsion system, or a high-voltage battery propulsion system.

20. The method of claim 15, wherein a fuel used by the propulsion system comprises ethanol, compressed natural gas, hydrogen, diesel, or gasoline.

* * * * *